United States Patent
Hussain et al.

(10) Patent No.: US 8,553,725 B2
(45) Date of Patent: Oct. 8, 2013

(54) SUPER-CHANNEL ASSIGNMENT USING A FLEXIBLE GRID

(75) Inventors: Iftekhar Hussain, Santa Clara, CA (US); Abinder Dhillon, Allen, TX (US); Zhong Pan, San Jose, CA (US); Marco E. Sosa, San Jose, CA (US)

(73) Assignee: Infinera Corporation, Sunnyvale, CA (US)

( * ) Notice: Subject to any disclaimer, the term of this patent is extended or adjusted under 35 U.S.C. 154(b) by 187 days.

(21) Appl. No.: 13/249,642

(22) Filed: Sep. 30, 2011

(65) Prior Publication Data

US 2013/0084075 A1    Apr. 4, 2013

Related U.S. Application Data

(60) Provisional application No. 61/510,615, filed on Jul. 22, 2011.

(51) Int. Cl.
*H04J 4/00* (2006.01)

(52) U.S. Cl.
USPC .................. 370/478; 398/43; 398/55; 398/68; 398/69

(58) Field of Classification Search
USPC .................. 370/464, 478; 398/43, 55, 68, 69
See application file for complete search history.

(56) References Cited

U.S. PATENT DOCUMENTS

| 2010/0272036 | A1* | 10/2010 | Ramakrishna | 370/329 |
| 2011/0197239 | A1* | 8/2011 | Schlack | 725/95 |
| 2012/0321306 | A1* | 12/2012 | Wellbrock et al. | 398/48 |

OTHER PUBLICATIONS

Hussain et al., "Generalized Label for Super-Channel Assignment on Flexible Grid", Jul. 25, 2011, http://tools.ietf.org/html/draft-hussain-ccamp-super-channel-label-00, pp. 1-16.

* cited by examiner

*Primary Examiner* — Charles C Jiang
(74) *Attorney, Agent, or Firm* — Harrity & Harrity LLP; David L. Soltz

(57) ABSTRACT

A node is configured to receive an instruction to establish a channel having a bandwidth that corresponds to an operating spectrum an optical fiber; obtain information that identifies a channel spacing and a pointer that identifies where, within the spectrum, to establish bandwidth allocations; identify a group of bandwidth segments based on the spectrum and the channel spacing; and generate bit words that correspond to the bandwidth allocations, where the bit words includes bits that, when set to a value, cause sets of segments to be reserved within the spectrum, and where the sets of segments identify where the bandwidth allocations begin and end, within the spectrum, relative to the pointer.

24 Claims, 5 Drawing Sheets

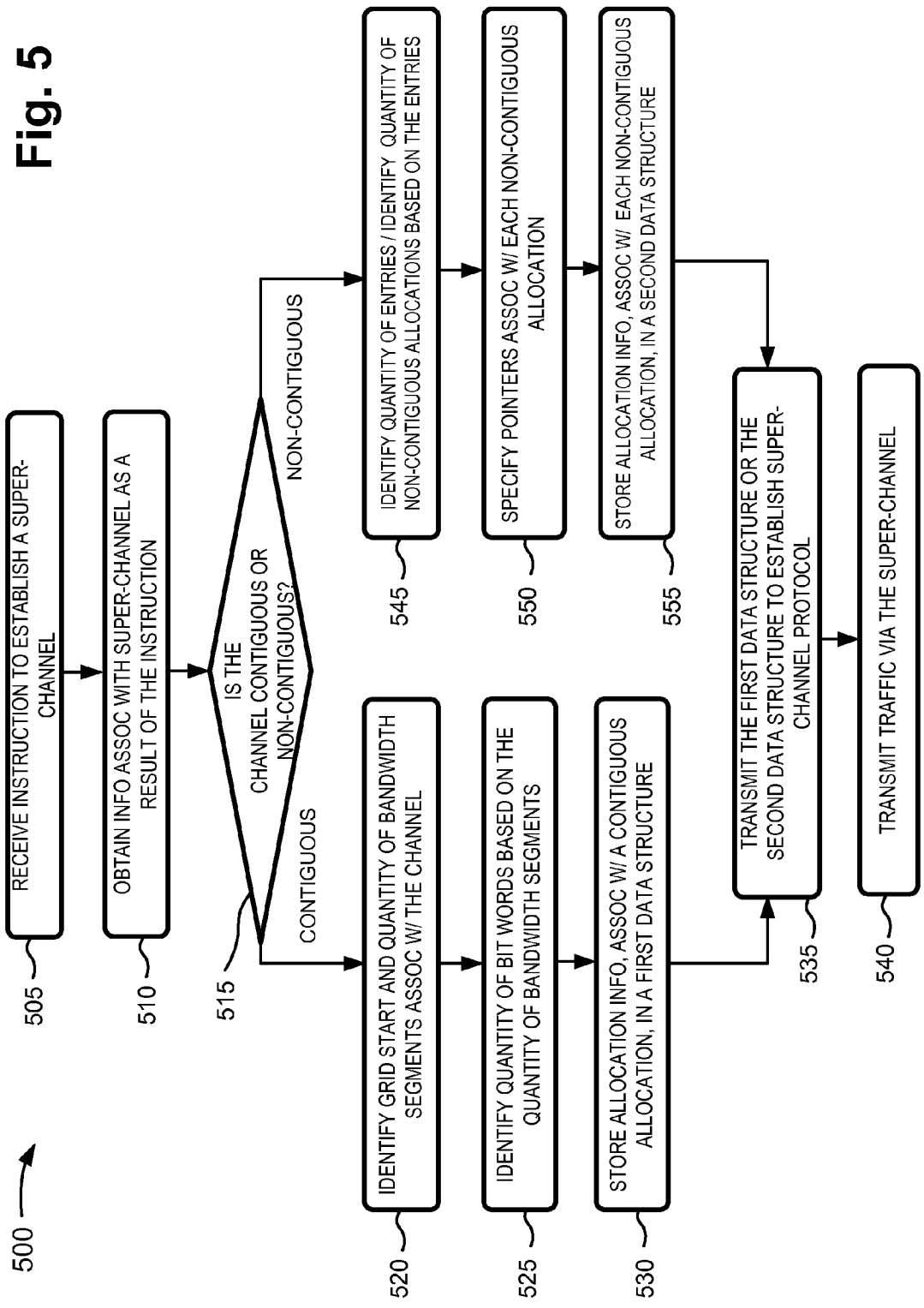

SUPER-CHANNEL ASSIGNMENT USING A FLEXIBLE GRID

This application claims the benefit of U.S. Provisional Application No. 61/510,615, filed Jul. 22, 2011, the entire contents of which are incorporated herein by reference.

BACKGROUND

In an increasingly networked world, more and more traffic, such as data, voice, and video, is transmitted over public and proprietary networks. The networks are using high data rates (e.g., one hundred gigabits per second (Gbps)) to transport greater quantities of traffic within a period of time. Certain types of the networks, such as optical networks, transport the traffic by allocating channel spectrum bandwidth, using a fixed channel size scheme (e.g., in bandwidth increments of 50 gigahertz (GHz), 100 GHz, etc.), that is independent of a channel bit rate. Unfortunately, it is difficult to scale optical networks to transport greater quantities of traffic at even higher data rates, such as ultra-high data rates (e.g., one terabit per second (Tbps)), using the fixed channel size scheme.

SUMMARY

According to one aspect, a method may include receiving, by a node, an instruction to establish a channel having a bandwidth that is based on an operating spectrum associated with one or more optical fibers served by the node; obtaining, by the node and as a result of the instruction, information that identifies a channel spacing and a pointer that identifies where, within the operating spectrum, to establish one or more bandwidth allocations; and identifying, by the node, a group of bandwidth segments based on the operating spectrum and the channel spacing. The method may also include generating, by the node, one or more bit words that correspond to the one or more bandwidth allocations to be used for the channel, where each of the one or more bit words may include a respective set of bits that, when set to a value, cause one or more sets of bandwidth segments, of the group of bandwidth segments, to be reserved within the operating spectrum, and where the one or more sets of bandwidth segments may identify where the one or more bandwidth allocations begin and end, within the operating spectrum, relative to the pointer. The method may further include transmitting, to a destination node, an instruction to establish the channel, where the instruction may include the pointer, the channel spacing, and the one or more bit words; and transmitting the traffic, to the destination node and via the channel, based on an indication that the destination node established the channel.

According to another aspect, a network node may include a line card; and a controller to receive an instruction to establish a channel having an operating spectrum that associated with one or more optical fibers served by the node; and obtain, as a result of the instruction, information that identifies a quantity of entries to be used to establish the channel, where the quantity of entries may identify a quantity of bandwidth allocations to be used to establish the channel. The node may also include the one or more processors to identify, based on the quantity of entries, a first pair of pointers that identify a first bandwidth segment and a second bandwidth segment, where the first bandwidth segment and the second bandwidth segment may identify where, within the operating spectrum, a first bandwidth allocation starts and ends, respectively; identify, based on the quantity of entries, a second pair of pointers that identify a third bandwidth segment and a fourth bandwidth segment, where the third bandwidth segment and the fourth bandwidth segment may identify where, within the operating spectrum, a second bandwidth allocation starts and ends, respectively; and transmit, to a destination node, allocation information that identifies at least one of the quantity of entries, the first pair of pointers, or the second pair of pointers, where the allocation information may allow the destination node to establish the channel based on the first bandwidth allocation and the second bandwidth allocation; and transmit, to the destination node and via the line card, first traffic via the first bandwidth allocation and second traffic via the second bandwidth allocation.

According to yet another aspect, a node may include an output port; and a controller to receive an instruction to establish a channel having an operating spectrum associated with one or more optical fibers served by the node; determine, based on the instruction, a quantity of entries to be used to establish the channel; generate a first pair of pointers when the quantity of entries is equal to one, where the first pair of pointers may identify a beginning and an end of a contiguous group of bandwidth segments, of a group of bandwidth segments associated with the operating spectrum; and generate at least a second pair of pointers and a third pair of pointers when the quantity of entries is greater than one, where the second pair of pointers may identify a beginning and an end of a second contiguous group of bandwidth segments, of the group of bandwidth segments, and where the third pair of pointers may identify a beginning and an end of a third contiguous group of bandwidth segments, of the group of bandwidth segments. The node may also use the one or more processors to establish a first channel or a second channel based on whether the quantity of entries is greater than one, where the first channel may be based on a first bandwidth allocation that is reserved by the first contiguous group of bandwidth segments, and where the second channel may be based on a second bandwidth allocation that is reserved by the second contiguous group of bandwidth segments and the third contiguous group of bandwidth segments; and transmit traffic, via the output port and to the other node, via the first channel or the second channel.

BRIEF DESCRIPTION OF THE DRAWINGS

FIG. 5 is a flow chart of an example process for establishing a super-channel using a flexible-grid channel allocation scheme.

DETAILED DESCRIPTION

The following detailed description refers to the accompanying drawings. The same reference numbers in different drawings may identify the same or similar elements.

A system and/or method, in an example implementation, may allow a node to transport traffic, via a network path, using a super-channel that is based on a bandwidth that can be specified based on the traffic, rather than on a fixed quantity of bandwidth that has been predetermined by the node (e.g., based on fixed increments of 50 gigahertz (GHz), 100 GHz, etc.). The super-channel may also, or alternatively, correspond to a channel with an ultra-high capacity (e.g., permitting data rates greater than one terabit per second (Tbps)) that allows multiple carriers to be aggregated and/or co-routed as a single entity (hereinafter referred to as "aggregated traffic" or an "aggregated signal"), from a source node to a destination node, via the network.

The system and/or method may use a flexible-grid channel bandwidth allocation scheme to establish a super-channel associated with a tailored quantity of bandwidth (hereinafter referred to as "channel bandwidth") that, in one example, is greater than a bandwidth allocation scheme that is based on a fixed quantity of bandwidth. The system and/or method may allow the super-channel to be established by causing a data structure, that stores information that identifies a manner in which channel bandwidth is to be allocated, to be transmitted on a network path between a source node and a destination node.

The system and/or method may store, in a data structure, one or more sets of bits (hereinafter each set of bits is referred to as a "bit word") that represent equal portions of contiguous channel bandwidth to be allocated for a super-channel that is to be established. The system and/or method may logically arrange each bit word so that a contiguous quantity of channel bandwidth is allocated (e.g., such that no unallocated portion of the channel bandwidth is permitted between the bit words) to the super-channel. The system and/or method may adjust the quantity of bit words to tailor the quantity of channel bandwidth to be allocated based on an amount of bandwidth associated with aggregated traffic to be transported via the super-channel.

The system and/or method may, in another example implementation, store, in a data structure, one or more pairs of start pointers and end pointers that represent bandwidth segments associated with a beginning and an end, respectively, of one or more non-contiguous bandwidth allocations to be used to establish a super-channel that is to be established. Each non-contiguous bandwidth allocation may be separate, in frequency, from an adjacent non-contiguous bandwidth allocation.

The term "packet" as used herein, may refer to a datagram, a data item, or a cell; a fragment of a packet, a fragment of a datagram, a fragment of a data item, a fragment of a cell; or another type, arrangement, or packaging of data.

Figure 1:
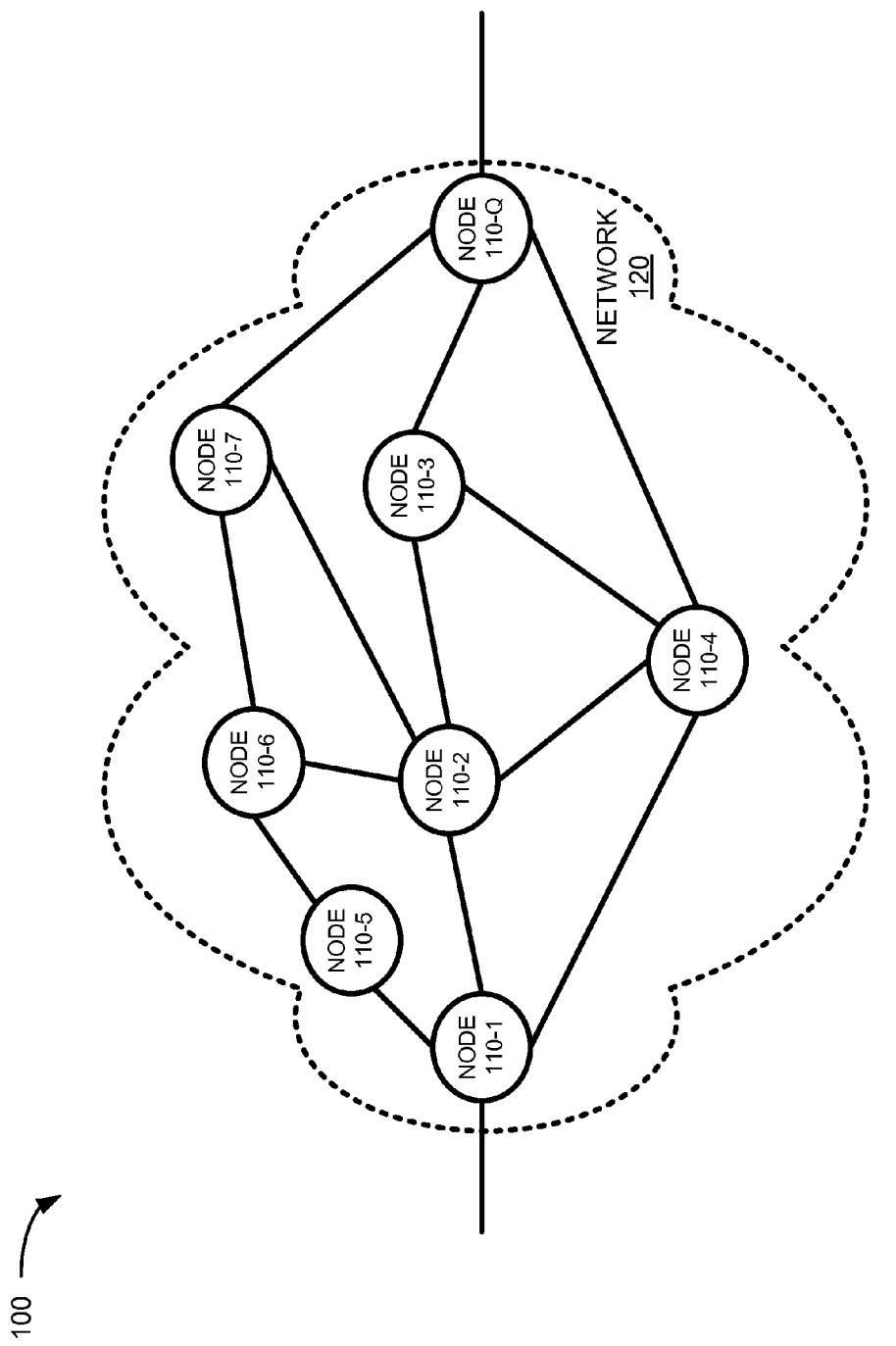
FIG. 1 is a diagram illustrating an example environment in which the systems and/or methods, described herein, may be implemented.

FIG. 1 is a diagram illustrating an example environment 100. As shown in FIG. 1, environment 100 may include a group of network nodes 110-1, ..., node 110-Q (where Q≥1) (hereinafter collectively referred to as "nodes 110" and individually as "node 110") and a network 120. FIG. 1 shows an example set of nodes and/or networks that may be included in environment 100 for explanatory purposes. In other implementations, environment 100 may include fewer nodes and/or networks, different nodes and/or networks, differently arranged nodes and/or networks, or additional nodes and/or networks than depicted in FIG. 1. In still other implementations, one or more devices of environment 100 may perform one or more tasks described as being performed by one or more other nodes of environment 100. Also, or alternatively, the links between nodes of environment 100 may be wired links, wireless links, or a combination of wired and wireless links.

Node 110 may include a network device that transmits data traffic. For example, node 110 may take the form of a routing device, a switching device, a multiplexing device, or a device that performs a combination of routing, switching, and/or multiplexing functions. In one implementation, node 110 may be a digital device. In another implementation, node 110 may be an optical device. In yet another implementation, node 110 may be a combination of a digital device and an optical device.

Node 110 may include an internal or external storage device and/or memory that stores information associated with node 110 operations. In one example, node 110 may store, in the storage device and/or memory, network topology information, routing tables and/or packet forwarding tables. In one example, node 110 may act as an edge device and may generally function to connect network 120 to another network or device. In another example, node 110 may act as a core device and may function to transmit traffic between other nodes 110 within network 120. Node 110 may add (push) and/or remove (pop) information (e.g., headers, trailers, tags, labels, etc.) from incoming and/or outgoing packets.

Node 110 may act as a source node 110 and may establish a network path with a destination node 110. Source node 110 may establish a super-channel, associated with the network path, based on a flexible-grid scheme that allows aggregated traffic to be transported via the super-channel. The super-channel may permit the traffic to be transmitted, via the network path, at an ultra-high data rate (e.g., greater than one Tbps, greater than two Tbps, greater than five Tbps, etc.).

For example, node 110 may receive, from a source device, an instruction to establish a super-channel, on a network path, via which aggregated traffic is to be transmitted to a destination device via a destination node 110. The instruction may specify a bandwidth to be used for the super-channel. Node 110 may, in an example implementation, generate information (hereinafter referred to as "allocation information") to be used to establish a super-channel based on a contiguous channel bandwidth allocation. Node 110 may, in another example implementation, generate allocation information to be used to establish a super-channel based on a non-contiguous channel bandwidth allocation.

Node 110 may store the channel information in a data structure and may append the data structure to a packet (e.g., as a header, trailer, label, etc.) and/or embed the data structure within the packet (e.g., within a packet payload, header, trailer, label, etc.). Node 110 may transmit the packet to destination node 110 and, possibly, via one or more intermediate nodes 110 that are located on the network path between node 110 and destination node 110. The intermediate nodes 110 and/or destination node 110 may receive the packet and may reserve operating bandwidth to accommodate the super-channel via which the aggregated traffic is to be transmitted.

Network 120 may include one or more wired and/or wireless networks. For example, network 120 may include a cellular network, a public land mobile network (PLMN), a second generation (2G) network, a third generation (3G) network, a fourth generation (4G) network (e.g., a long term evolution (LTE) network), a fifth generation (5G) network, and/or another network. Additionally, or alternatively, network 120 may include a wide area network (WAN), a metropolitan network (MAN), a telephone network (e.g., the Public Switched Telephone Network (PSTN)), an ad hoc network, an intranet, the Internet, a fiber optic-based network (e.g., a FiOS network), and/or a combination of these or other types of networks.

Figure 2:
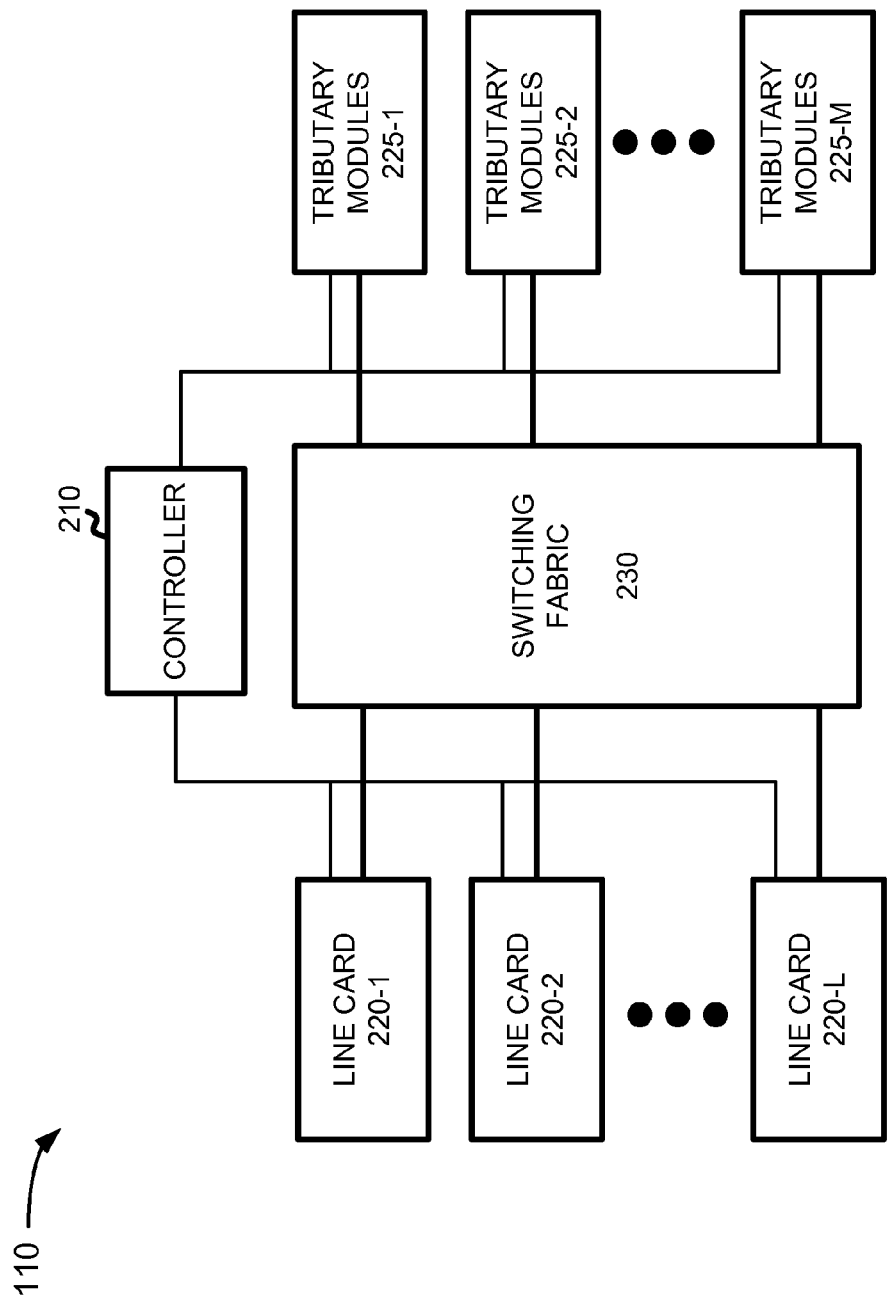
FIG. 2 is a diagram illustrating example components of a node in the environment of FIG. 1.

FIG. 2 is a diagram of exemplary components of node 110. As shown in FIG. 2, node 110 may include controller 210, line card 220-1, 220-2, ..., 220-L (referred to collectively as "line cards 220," and individually as "line card 220") (where L≥1), and tributary modules 225-1, 225-2, . . . 225-M (referred to collectively as "tributary modules 225," and individually as "tributary module 225") (where M≥0) connected via switching fabric 230. While FIG. 2 shows a particular number and arrangement of components, node 110 may include additional, fewer, different, or differently arranged components than those illustrated in FIG. 2. For example, node 110 may alternatively, or additionally, include digital switching components.

Controller 210 may include a processor, a microprocessor, or some form of hardware logic (e.g., an application specific integrated circuit (ASIC) or a field programmable gate array (FPGA)). In one example implementation, controller 210 may include an Ethernet controller and/or another controller device. Controller 210 may perform high level management functions for node 110. For example, controller 210 may maintain the connectivity and manage information/data necessary for transferring packets by node 110. Controller 210 may create routing tables based on network topology information, create forwarding tables based on the routing tables, and communicate the forwarding tables to line card 220 and/or tributary module 225. Line card 220 and/or tributary module 225 may use the forwarding tables to perform route lookup for incoming packets and perform the forwarding functions for node 110. Controller 210 may also perform other general control and monitoring functions for node 110.

Line card 210 may include components that may provide retiming, reshaping, regeneration, and/or recoding services for each optical wavelength. Line card 210 may include a receiver photonic integrated circuit (PIC) and/or a transmitter PIC. The receiver PIC may receive a multi-wavelength signal, separate the multi-wavelength signal into client signals of individual wavelengths, and convert the client signals to digital form. The transmitter PIC may convert client signals from digital form, combine the client signals of the individual wavelengths into a multi-wavelength signal, and transmit the multi-wavelength signal. Line card 210 may also include add-drop circuitry to remove one or more client signals from the multi-wavelength signal.

Tributary module 225 may include hardware components, or a combination of hardware and software components, that may terminate client signals. For example, tributary module 225 may support flexible adding-dropping of multiple services, such as SONET/SDH services, GbE services, optical transport network (OTN) services, and FC services. Tributary module 225 may encapsulate client signals in a data frame, as described below. The data frame may permit all types of services to be transparent and robustly managed.

Switch fabric 230 may include one or more switching modules operating in one or more switching planes. Each switching module may permit a cross-connect to be established between two line cards 210 or between a line card 210 and a tributary module 225. In one implementation, the switching modules are non-blocking and/or hot-swappable.

Figure 3A:
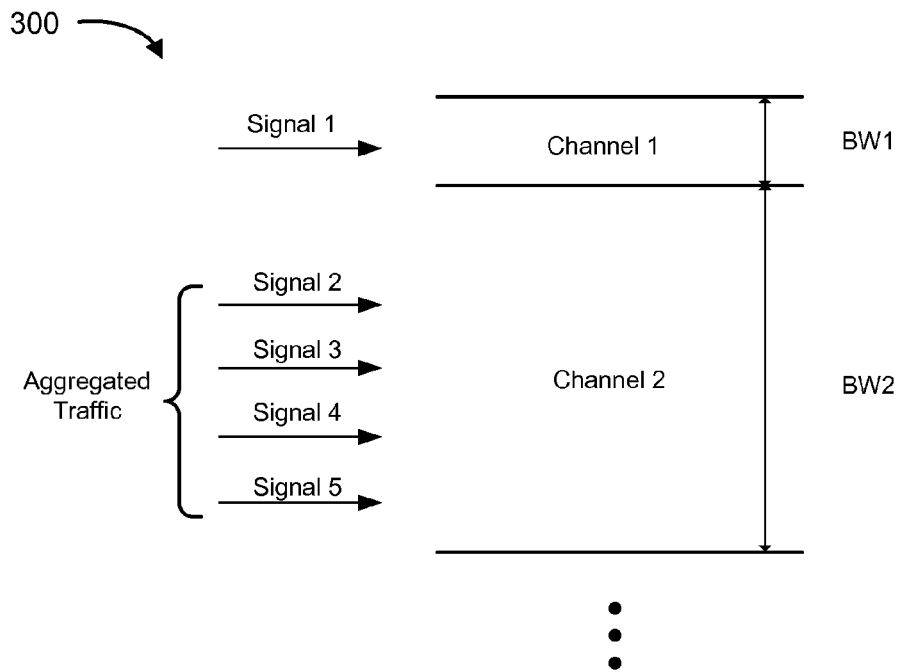
FIGS. 3A and 3B are diagrams of example super-channels based on a flexible-grid channel bandwidth allocation schemes, according to an implementation described herein.
Figure 3B:
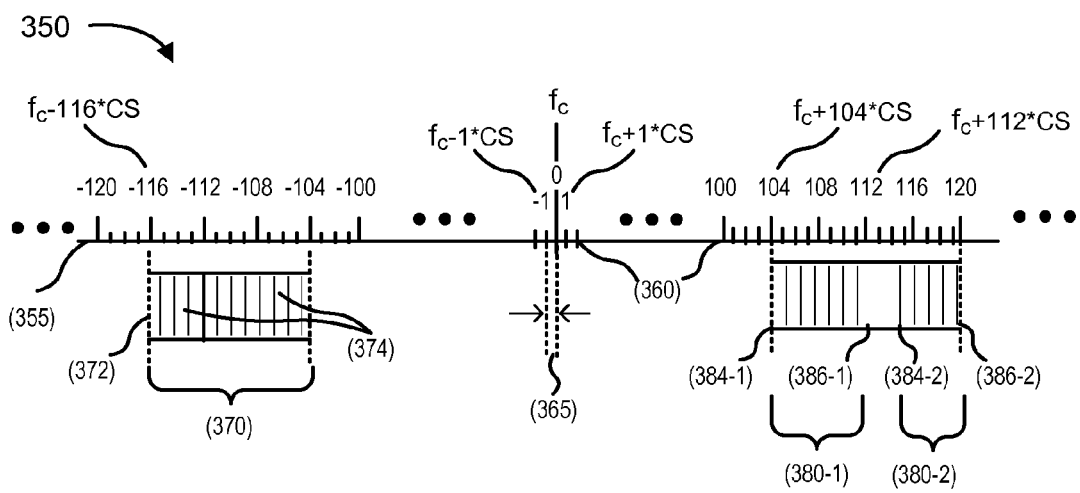

FIGS. 3A and 3B are diagrams of example super-channels based on a flexible-grid channel bandwidth allocation schemes, according to an implementation described herein. As shown in FIG. 3A allocation scheme 300 may represent a first channel (e.g., channel 1) and a second channel (e.g., channel 2) associated with a first bandwidth (e.g., BW1) and a second bandwidth (e.g., BW2), respectively. Node 110 may transmit a first signal (e.g., signal 1) via the first channel. The first channel may be based on a fixed-grid bandwidth allocation scheme that allocates a fixed quantity of bandwidth (e.g., at fixed increments of 50 GHz, 100 GHz, etc.) that is independent of a bandwidth associated with the first signal. Thus, if the bandwidth, associated with signal 1, is significantly less than the first bandwidth, then bandwidth resources associated with node 110 may be wasted or utilized in an inefficient manner. Additionally, or alternatively, if the bandwidth, associated with the first signal, is equal to or greater than the first bandwidth, then the first channel may become congested.

A second channel (e.g., channel 2) may represent a super-channel that has been established by node 110. Node 110 may allocate the second bandwidth based on a bandwidth associated with aggregated traffic to be transmitted via the second channel. The aggregated traffic may be represented by a second signal (e.g., signal 2), a third signal (e.g., signal 3), a fourth signal (e.g., signal 4), and a fifth signal (e.g., signal 5). Because the second bandwidth is allocated based on the bandwidth associated with the aggregated traffic, the bandwidth resources, associated with the node 110, may not be wasted or used in an inefficient manner.

As shown in FIG. 3B, allocation scheme 350 may represent a flexible-grid scheme to be used, by node 110, to establish a contiguous channel bandwidth allocation or a non-contiguous channel bandwidth allocation. Allocation scheme 350 may include a frequency grid 355, a collection of grid units 360, a channel spacing 365, a contiguous allocation 370, and a pair of non-contiguous bandwidth allocations 380-1 and 380-2 (hereinafter referred to collectively as "non-contiguous allocations 380" and individually as "non-contiguous allocation 380").

Frequency grid 355 may represent an operating bandwidth spectrum associated with node 110. Frequency grid 355 may identify a center frequency (e.g., $f_c$) within the operating bandwidth spectrum. Grid unit 360 may represent a unit, on frequency grid 355, that corresponds to a frequency within the operating bandwidth spectrum. Each grid unit 360 may correspond to a different frequency within the operating bandwidth spectrum. A first grid unit 360 (e.g., labeled as "0") may, for example, correspond to the center frequency. A second grid unit 360 (e.g., labeled as "1") may represent an operating frequency that is greater than the center frequency by a grid unit value. A third grid unit 360 (e.g., labeled as "−1") may represent an operating frequency that is less than the center frequency. Further grid units 360 (e.g., ±2, ±3, etc.) may correspond to other operating frequencies, above and/or below the center frequency, within the operating bandwidth spectrum.

Channel spacing 365 may represent a quantity of bandwidth (sometimes referred to as "channel spacing") between each adjacent grid unit 360 (e.g., 6.25 GHz, 12.5 GHz, etc.). Thus, the operating frequency that corresponds to a particular grid unit 360 may be based on the particular grid unit 360 and the channel spacing (e.g., $f_{op} \approx f_c + G*CS$, where CS represents the channel spacing, G represents the grid unit, and $f_{op}$ represents the operating frequency). For example, the operating frequency associated with the second grid unit 360 (e.g., labeled as "1") may be represented by $f_c+1*CS$. Additionally, or alternatively, the operating frequency associated with the third grid unit 360 (e.g., labeled as "−1") may be represented by $f_c-1*CS$. Grid unit 360 may be determined when the channel spacing, center frequency, and the operating frequency are known (e.g., $G \approx (f_{op}-f_c)/CS$).

Contiguous allocation 370 may represent a channel bandwidth that has been reserved, by node 110, for a super-channel. Contiguous allocation 370 may include a grid start pointer 372 and bit words 374. Grid start pointer 372 may represent where, within the operating bandwidth spectrum, the channel bandwidth starts. Grid start pointer 372 may, for example, correspond to a particular frequency, associated with the contiguous allocation, such as a left-most, or lowest, operating frequency associated with the contiguous allocation. Grid start pointer 372 may also, or alternatively, identify a grid unit 360 (e.g., −116) that corresponds to the left-most frequency (e.g., based on $G=(f_{op}-f_c)/CS$, where $f_{op}$, in this example, represents the left-most operating frequency). In another example, grid start pointer 372 may correspond to another frequency, associated with the contiguous allocation (e.g., a mid-point frequency, a right-most frequency, etc.).

Bit words 374 may represent one or more bit words that are included in the channel bandwidth. Each bit word 374 may represent a fixed quantity of bits, where each bit allows a quantity of bandwidth (e.g., a bandwidth segment), that corresponds to channel spacing 365, to be reserved. A second bit word 374 may begin immediately after (e.g., to the right of) a last bit associated with a first bit word 374, such that no bandwidth segments exist between a first bandwidth allocation associated with the first bit word 374 and a second bandwidth allocation associated with the second bit word 374. Additionally, or alternatively, a third bit word 374 may not begin immediately after a last bit associated with the second bit word 374, such that one or more bandwidth segments exist between the second bandwidth allocation and a third bandwidth allocation associated with the third bit word 374.

Non-contiguous allocation 380 may represent a non-contiguous channel bandwidth allocation that has been reserved, by node 110, for a super-channel. Non-contiguous allocation 380 may include a pair of start pointers 384-1 and 384-2 (hereinafter referred to collectively as "start pointers 384" and individually as "start pointer 384"), and pair of end pointers 386-1 and 386-2 (hereinafter referred to collectively as "end pointers 386" and individually as "end pointer 386").

Start pointer 384 may identify where a particular non-contiguous allocation 380 starts. For example, start pointer 384 may identify a left-most bandwidth segment associated with non-contiguous allocation 380. The left-most bandwidth segment may, for example, correspond to a lowest frequency (e.g., fc+104*CS) associated with a first non-contiguous allocation 380-1. End pointer 386 may represent where the particular non-contiguous allocation 380 ends. For example, end pointer 386 may identify a right-most bandwidth segment associated with non-contiguous allocation 380. The right-most bandwidth segment may, for example, correspond to a highest frequency (e.g., fc+112*CS) associated with the first non-contiguous allocation 380-1. Non-contiguous allocations 380 may be non-contiguous, such that one or more bandwidth segments, that are not reserved by one of non-contiguous allocations 380, may exist between adjacent non-contiguous allocations 380. For example, bandwidth segments that have not been reserved, by the first non-contiguous allocation 380-1 or the second non-contiguous allocation 380-2, may exist between end pointer 386-1 and start pointer 384-2.

Figure 4A:
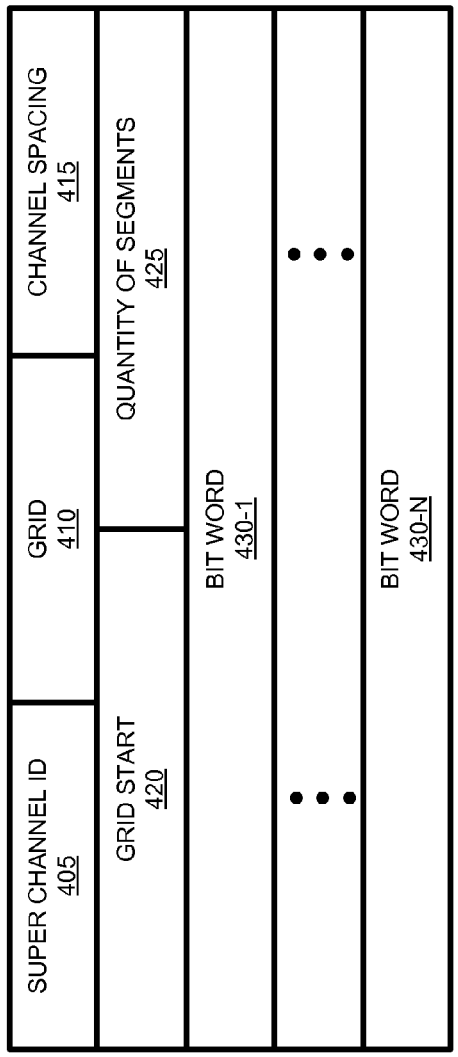
FIGS. 4A and 4B are diagrams of example data structures that store allocation information that identifies how spectral bandwidth is to be allocated to establish a super-channel according to an implementation described herein.
Figure 4B:
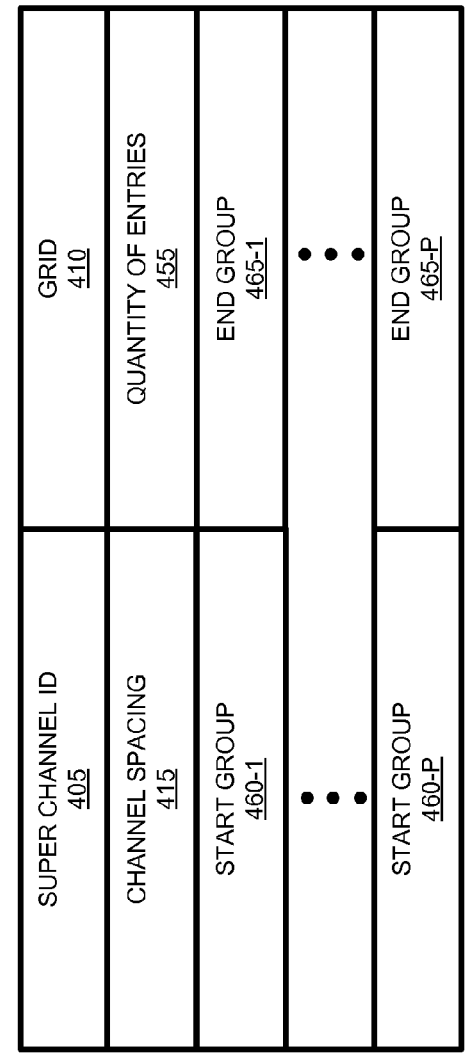

FIGS. 4A and 4B are diagrams of example data structures that store allocation information that identifies how spectral bandwidth is to be allocated to establish a super-channel according to an implementation described herein. As illustrated in FIG. 4A contiguous data structure 400 may include a collection of fields, such as a super-channel identifier (ID) field 405, a grid field 410, a channel spacing field 415, a grid start field 420, a quantity of segments field 425, and a collection of bit word fields 430-1, . . . , 430-N (where N≥1) (hereinafter referred to collectively as "bit word fields 430" and individually as "bit word field 430"). Contiguous data structure 400 includes fields 405-430 for explanatory purposes. In practice, contiguous data structure 400 may include additional fields, fewer fields, different fields, and/or differently arranged fields than are described with respect to contiguous data structure 400.

Super-channel ID field 405 may store information (e.g., an identifier, a name, etc.) that uniquely identifies a super-channel associated with node 110. Grid field 410 may store information (e.g., a particular value, a string, a flag, etc.) that indicates that a channel is to be established based on a flexible-grid scheme. Channel spacing field 415 may store information that specifies a quantity of bandwidth associated with a channel spacing (e.g., 6.25 GHz, 12.5 GHz, 25 GHz, etc.) to be used when establishing the super-channel based on the flexible-grid scheme.

Grid start field 420 may store information that identifies a particular frequency, within an operating bandwidth spectrum associated with node 110, at which the channel bandwidth starts. Grid start field 420 may identify a location (e.g., that corresponds to a grid unit 372 of FIG. 3B), associated with a flexible-grid allocation scheme (e.g., allocation scheme 350 of FIG. 3B), where a first bit word, identified in bit word field 430-1, is to start.

Quantity of segments field 425 may store information that identifies a quantity of bandwidth segments (sometimes referred to as "frequency slices") to be included in the channel bandwidth allocation to be used to establish the super-channel. Each bandwidth segment may correspond to a quantity of bandwidth that corresponds to the channel spacing identified in channel spacing field 415. The channel bandwidth may be based on the channel spacing and the quantity of bandwidth segments (e.g., channel bandwidth≈CS*S, where CS represents the channel spacing and where S represents the quantity of bandwidth segments).

Bit word field 430 may store a fixed quantity of bits (e.g., 16 bits, 32 bits, 64 bits, etc.) associated with a particular bit word. Each bit may be used to reserve a particular bandwidth segment to be used by the super-channel. For example, a bit set to a first value (e.g., "1" or some other value) may cause a bandwidth segment, within the channel bandwidth, to be reserved. In another example, a bit set to a second value (e.g., "0" or some other value) may cause a bandwidth segment not to be reserved. Additionally, or alternatively, the quantity of segments, identified in quantity of segments field 425 may correspond to a quantity of bit words 430. For example, if the fixed quantity of bits, associated with a first bit word (e.g., stored in bit word field 430-1) is greater than, or equal to, the quantity of segments, then contiguous data structure 400 may include only the first bit word. In another example, if the fixed quantity of bits is less than the quantity of segments, then contiguous data structure 400 may store more than one bit word (e.g., in bit word field 430-2, etc.). For example, a first bit word and a second bit word may be specified based on the quantity of segments. The first bit word and the second bit word may be contiguous. For example, a first bit associated with the second bit word may be adjacent to a last bit associated with the first bit word.

As illustrated in FIG. 4B, non-contiguous data structure 450 may include fields 405-415 as described above with respect to FIG. 4A. Data structure 450 may also include a collection of fields, such as a quantity of entries field 455, a collection of start group fields 460-1, . . . , 460-P (where P≥1) (hereinafter referred to collectively as "start group fields 460" and individually as "start group field 460"), and a collection of end group fields 465-1, . . . , 465-P (where P≥1) (hereinafter referred to collectively as "end group fields 465" and individually as "end group field 465"). Non-contiguous data structure 450 includes fields 405-415 and fields 455-465 for explanatory purposes. In practice, non-contiguous data structure 450 may include additional fields, fewer fields, different fields, and/or differently arranged fields than are described with respect to non-contiguous data structure 450.

Quantity of entries field 455 may store information that identifies a quantity of pairs of start and end pointers that are used to identify first and last bandwidth segments associated with non-contiguous bandwidth allocations (e.g., non-contiguous allocation 380 of FIG. 3B) to be used to establish the super-channel. Start group field 460 may store information that corresponds to a start pointer (e.g., start pointer 384 of FIG. 3B) that identifies a bandwidth segment within an operating bandwidth spectrum associated with node 110. In one example, start group field 460 may store a start pointer that identifies a left-most bandwidth segment (e.g., associated with a lowest frequency) associated with a non-contiguous allocation. End group field 465 may store information that corresponds to an end pointer (e.g., end pointer 386, of FIG. 3B) that identifies a bandwidth segment within the operating bandwidth spectrum. In one example, end group field 465 may store an end pointer that represents a right-most bandwidth segment (e.g., that corresponds to a highest frequency) associated with the non-contiguous allocation.

Start group field 460 and end group field 465 may, thus, define a beginning and an end of a contiguous group of bandwidth segments on which a non-contiguous allocation is based. Start group field 460 and end group field 465 may cause the group of bandwidth segments to be reserved to establish the channel.

A pair of fields, that include start group field 460 and end group field 465, may be included in non-contiguous data structure 450 for each entry identified in quantity of entries field 455. For example, if quantity of entries field 455 indicates that two non-contiguous bandwidth allocations are to be included in non-contiguous data structure 450, then two pairs of fields 460 and 465 may be included in non-contiguous data structure 450. Additionally, or alternatively, the two non-contiguous bandwidth allocations may not be contiguous. For example a first non-contiguous bandwidth allocation may not be adjacent to a second non-contiguous bandwidth allocation, such that there may be unallocated bandwidth segments between a last bandwidth segment of the first allocation and the first bandwidth segment of the second allocation.

FIG. 5 is a flow chart of an example process for establishing a super-channel using a flexible-grid channel allocation scheme. In one example implementation, process 500 may be performed by node 110. In another example implementation, some or all of process 500 may be performed by a device or collection of devices separate from, or in combination with, node 110.

As shown in FIG. 5, process 500 may include receiving a request to establish a super-channel (block 505) and obtaining information associated with the super-channel in response to the request (block 510). Node 110 may receive an instruction, from a source device, to establish a super-channel via which aggregated traffic, destined for a destination device, is to be transported. Node 110 may obtain, from the instruction, information associated with the super-channel. The information, associated with the super-channel, may identify one or more bandwidth values that correspond to one or more signals associated with the aggregated traffic. Additionally, or alternatively, the super-channel information may identify whether the super-channel is to include a contiguous or non-contiguous allocation of channel bandwidth.

Node 110 may, as a result of the instruction, generate information that uniquely identifies the super-channel (e.g., super-channel identifier, name, etc.). Node 110 may retrieve, from a memory associated with node 110, information associated with a flexible-grid scheme with which to establish the super-channel. The information associated with the flexible-grid scheme may identify a channel spacing (e.g., 6.25 GHz, 12.5 GHz, 25 GHz, etc.) to be used for the super-channel.

As also shown in FIG. 5, if the channel is contiguous (block 515—CONTIGUOUS), then process 500 may include identifying a grid start and/or a quantity of segments associated with the channel (block 520). For example, node 110 may, based on the information associated with the super-channel, determine that the super-channel is to be established based on a contiguous allocation (e.g., contiguous allocation 370 of FIG. 3B) within the operating spectral bandwidth. Node 110 may, in one example, obtain, from the information associated with the super-channel, information that identifies a first operating frequency (e.g., $f_{op1}$) associated with the contiguous allocation. The first operating frequency may correspond to a left-most frequency (e.g., a lowest operating frequency) associated with the contiguous allocation. In another example, node 110 may automatically identify the first operating frequency associated with the contiguous allocation that is available to establish the super-channel.

Node 110 may identify a grid start pointer (e.g., grid start pointer 372 of FIG. 3B), associated with the contiguous allocation, based on a particular grid unit (e.g., grid unit 360 of FIG. 3B) associated with the contiguous allocation. The grid unit may, in a manner similar to that described above with respect to FIG. 3B, be based on the channel spacing, a center frequency, and/or the first operating frequency (e.g., $G \approx (f_{op1} - f_c)/CS$). For example, node 110 may compute the grid start pointer by dividing a first quantity, defined as a difference between the first frequency and the center frequency, by the channel spacing (e.g., grid start pointer $\approx (f_1 - f_c)/CS$, where CS is the channel spacing).

Node 110 may identify a quantity of bandwidth segments associated with the contiguous allocation based on the bandwidth associated with the aggregated traffic and the channel spacing. For example, node 110 may compute the quantity of bandwidth segments by dividing the bandwidth, associated with the aggregated traffic, by the channel spacing (e.g., $S \approx BW/CS$, where S represents the quantity of bandwidth segments and BW represents the aggregated traffic bandwidth). The quantity of bandwidth segments, associated with the contiguous allocation, may correspond to a quantity of bits to be stored in an allocation data structure in the form of one or more bit words.

As further shown in FIG. 5, process 500 may include identifying a quantity of bit words based on the quantity of bandwidth segments (block 525) and storing allocation information, associated with a contiguous allocation, in a first data structure (block 530). For example, node 110 may identify a quantity of bit words to be used to establish the super-channel based on a fixed quantity of bits to be used per bit word and the quantity of bandwidth segments. For example, node 110 may identify a quantity of bit words by dividing the quantity of bandwidth segments by the fixed quantity of bits per bit word (e.g., bit word quantity $\approx S/Q_{bit}$, where $Q_{bit}$ represents the fixed quantity of bits per bit word).

Node 110 may store, in a first data structure (e.g., contiguous allocation data structure 400 of FIG. 4A) allocation information associated with the contiguous allocation to be used to establish the super-channel. The allocation information may include the information that uniquely identifies the super-channel relative to a fixed-grid channel and/or other super-channels and/or information (e.g., such as a particular value, a string, a flag, etc.) that indicates that the super-channel is to be established based on the flexible-grid scheme. Additionally, or alternatively, the allocation information may include a value associated with the channel spacing, a value associated with the start grid pointer, and/or a value that identifies the quantity of bandwidth segments associated with the contiguous allocation. Additionally, or alternatively, node 110 may store one or more bit words (e.g., bit words 430 of FIG. 4A) within the data structure that corresponds to the quantity of bit words. Node 110 may set each bit, within the bit words, to a first value (e.g., "1" or some other value), that causes each bandwidth segment, associated with the contiguous allocation, to be reserved for the super-channel.

Node 110 may, in another example, set only a portion of the bits, within a last bit word, to the first value to accommodate the bandwidth associated with the traffic. For example, assume that two bit words are included within the allocation information and a quantity of bits, within the first bit word and a portion of the second bit word, accommodate the bandwidth associated with the traffic. Node 110 may set the bits, within the first bit word and the portion of the second bit word, to the first value to accommodate the bandwidth associated with the traffic. Node 110 may also, or alternatively, set bits, associated with a remaining portion of the second bit word, to a second value (e.g., "0" or some other value). Setting the bits, associated with the remaining portion of the second bit word to the second value, may cause bandwidth segments, corresponding to the bits, associated with the remaining portion of the second bit word, not to be reserved within the contiguous allocation.

As yet further shown in FIG. 5, process 500 may include transmitting the first data structure to establish the super-channel (block 535) and transmitting the traffic via the super-channel (block 540). For example, node 110 may append the data structure to a packet (e.g., as a header, trailer, tag, label, etc.). Node 110 may transmit the packet, via a network path and/or any intermediate nodes 110 on the network path, to a destination node 110 that communicates with one or more destination devices to which the aggregated traffic is intended.

The intermediate nodes 110 may receive the packet and may process the packet. For example, intermediate node 110 may remove, from the packet, the data structure to obtain the allocation information from the data structure. Intermediate node 110 may determine, based on the allocation information, that a contiguous type of super-channel (e.g., based on a contiguous allocation) is to be established based on the flexible-grid scheme. Intermediate node 110 may identify the channel spacing and the start grid pointer at which the contiguous allocation is to be started. Intermediate node 110 may reserve a quantity of bandwidth segments, to be used for the super-channel, based on the bit words included in the allocation information. Intermediate node 110 may transmit to the packet to destination node 110.

Destination node 110 may receive the packet and may reserve the contiguous allocation of channel bandwidth in a manner similar to that described with respect to the intermediate node 110. Destination node 110 and/or intermediate node 110 may transmit a notification, to node 110, that indicates that the super-channel has been established on a network path between node 110 and destination node 110. Node 110 may receive the notification and may transmit the aggregated traffic, via the super-channel established on the network path, to destination node 110. The super-channel may permit node 110 and/or intermediate node 110 to transmit the aggregated traffic at an ultra-high data rate (e.g., greater than one Tbps, greater than two Tbps, greater than five Tbps, etc.). Destination node 110 may receive the aggregated traffic and may transmit one or more portions, of the aggregated traffic, to one or more destination devices.

As also shown in FIG. 5, if the channel is non-contiguous (block 515—NON-CONTIGUOUS), then process 500 may include identifying a quantity of entries and/or a quantity of non-contiguous allocations based on the quantity of entries (block 545). For example, node 110 may, based on the information associated with the super-channel, determine that the super-channel is to be established based on one or more non-contiguous allocations (e.g., non-contiguous allocation 380 of FIG. 3B) within the operating spectral bandwidth of node 110. Node 110 may, in one example, obtain, from the information associated with the super-channel, information that identifies a first frequency band associated with a first portion of the aggregated traffic and a second frequency band associated with a second portion of the aggregated traffic. Node 110 may, based on the first frequency band and/or the second frequency band, determine a quantity of entries (e.g., two) that are to be used to establish the non-contiguous super-channel. Based on the quantity of entries, node 110 may identify a quantity of non-contiguous allocations that are to be used to establish the non-contiguous super-channel. In another example, node 110 may obtain, from information associated with the super-channel, a quantity of entries to be used to generate the super-channel.

In a specialized example, if the information, associated with the super-channel, specifies only one entry (e.g., corresponding to only one non-contiguous allocation), then the non-contiguous allocation reverts to a single contiguous allocation (e.g., described above with respect to blocks 520-540).

As also shown in FIG. 5, process 500 may include specifying pointers associated with each non-contiguous allocation (block 550) and storing allocation information, associated with each non-contiguous allocation, in a second data structure (block 555). For example, node 110 may identify a first start pointer (e.g., start pointer 384 of FIG. 3B), associated with a first non-contiguous allocation. The first start pointer may identify a left-most bandwidth segment (e.g., corresponding to a lowest frequency) associated with the first non-contiguous allocation. Node 110 may generate the start pointer by dividing a difference between the lowest frequency and the center frequency, by the channel spacing (e.g., $G1 \approx (f_1-f_c)/CS$, where $f_1$ is the lowest frequency associated with the left-most bandwidth segment and G1 is the first start pointer).

Node 110 may identify a first end pointer (e.g., end pointer 386 of FIG. 3B), associated with the first non-contiguous allocation. The first end pointer may identify a right-most bandwidth segment (e.g., corresponding to a highest frequency) associated with the first non-contiguous allocation. Node 110 may generate the first end pointer by dividing a difference between the highest frequency and the center frequency, by the channel spacing (e.g., $G2 \approx (f_2-f_c)/CS$, where $f_2$ is the highest frequency associated with the right-most bandwidth segment and G2 is the first end pointer). Node 110 may repeat process 500, described above, for the second non-contiguous allocation to generate a second start pointer (e.g., G3) and a second end pointer (e.g., G4).

Node 110 may identify a first non-contiguous allocation based on one or more contiguous bandwidth segments between the first start pointer and the first end pointer. Node 110 may identify the quantity of bandwidth segments, within the first non-contiguous allocation, based on a difference between the first end pointer and the first start pointer (e.g., a quantity of bandwidth segments $\approx$ G2–G1). Node 110 may identify a second non-contiguous allocation based on one or more other contiguous bandwidth segments, between the second start pointer and the second end pointer. Node 110 may identify the quantity of bandwidth segments, within the second non-contiguous allocation, based on a difference between the second end pointer and the second start pointer (e.g., a quantity of bandwidth segments≈G4–G3).

The first non-contiguous allocation may be used to transport a first portion of the aggregated traffic. The second non-contiguous allocation may be used to transport a second portion of the aggregated traffic.

Node 110 may store allocation information, associated with each non-contiguous allocation, in a second data structure (e.g., non-contiguous data structure 450 of FIG. 4B) to be used to establish the super-channel. The allocation information may include the information that uniquely identifies the super-channel and/or information (e.g., a particular value, a string, a flag, etc.) that indicates that the super-channel is to be established based on the flexible-grid scheme. Additionally, or alternatively, the allocation information may include a value associated with the channel spacing, a value associated with a quantity of entries, information associated with the first or second start pointer, and/or information associated with the first or second end pointer, etc.

As further shown in FIG. 5, process 500 may include transmitting the second data structure to establish the super-channel (block 535) and transmitting the traffic via the super-channel (block 540). For example, node 110 may, in a manner similar to that described above with respect to the block 535 and the first data structure, append the second data structure to a packet (e.g., as a header, trailer, tag, label, etc.) for transmission to the destination node 110, potentially via one or more intermediate nodes 110.

The intermediate nodes 110 may receive the packet and may process the packet. Intermediate node 110 may determine, based on the allocation information, that a non-contiguous type of super-channel (e.g., based on the non-contiguous allocations) is to be established based on the flexible-grid scheme. Intermediate node 110 may reserve bandwidth segments associated with the first non-contiguous bandwidth allocation and the second non-contiguous bandwidth allocation, to be used for the super-channel. Intermediate node 110 may transmit the packet to destination node 110. Destination node 110 may receive the packet and may reserve bandwidth segments associated with the first and second non-contiguous bandwidth allocations in a manner similar to that described with respect to the intermediate node 110.

Destination node 110 and/or intermediate node 110 may transmit a notification, to node 110, that indicates that the super-channel has been established on a network path between node 110 and destination node 110. Node 110 may receive the notification and may transmit the first portion of the aggregated traffic, via the first non-contiguous bandwidth allocation, to destination node 110. Node 110 may transmit the second portion of the aggregated traffic, via the second non-contiguous bandwidth allocation, to destination node 110. The super-channel may permit node 110 and/or intermediate node 110 to transmit the aggregated traffic at an ultra-high data rate (e.g., greater than one Tbps, greater than two Tbps, greater than five Tbps, etc.). Destination node 110 may receive the portions of the aggregated traffic and may transmit the portions, of the aggregated traffic, to one or more destination devices.

A system and/or method may allow a node to transport traffic, via a network path, using a super-channel that is based on a bandwidth that can be specified, based on the traffic, rather than on a fixed quantity of bandwidth that is predetermined by the node. The system and/or method may use a flexible-grid scheme to establish a contiguous super-channel or a non-contiguous super-channel. The system and/or method may allow the super-channel to be established by causing a data structure, that stores information that identifies a manner in which channel bandwidth is to be allocated, to be transmitted on a network path between a source node and a destination node.

The foregoing description provides illustration and description, but is not intended to be exhaustive or to limit the embodiments to the precise form disclosed. Modifications and variations are possible in light of the above disclosure or may be acquired from practice of the embodiments.

While a series of blocks has been described with regard to FIG. 5, the order of the blocks may be modified in other embodiments. Further, non-dependent blocks may be performed in parallel.

It will be apparent that embodiments, as described herein, may be implemented in many different forms of software, firmware, and hardware in the embodiments illustrated in the figures. The actual software code or specialized control hardware used to implement embodiments described herein is not limiting of the embodiments. Thus, the operation and behavior of the embodiments were described without reference to the specific software code—it being understood that software and control hardware may be designed to implement the embodiments based on the description herein.

Further, certain portions, described above, may be implemented as a component or logic that performs one or more functions. A component or logic, as used herein, may include hardware, such as a processor, ASIC, or FPGA, or a combination of hardware and software (e.g., a processor executing software).

Even though particular combinations of features are recited in the claims and/or disclosed in the specification, these combinations are not intended to limit the disclosure of the embodiments. In fact, many of these features may be combined in ways not specifically recited in the claims and/or disclosed in the specification. Although each dependent claim listed below may directly depend on only one other claim, the disclosure of the embodiments includes each dependent claim in combination with every other claim in the claim set.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a node, an instruction to establish a channel having a bandwidth that is based on an operating spectrum associated with one or more optical fibers served by the node;
   obtaining, by the node and as a result of the instruction, information that identifies a channel spacing and a pointer that identifies where, within the operating spectrum, to establish one or more bandwidth allocations;
   identifying, by the node, a plurality of bandwidth segments based on the operating spectrum and the channel spacing;
   generating, by the node, one or more bit words that correspond to the one or more bandwidth allocations to be used for the channel,
      where each of the one or more bit words includes a respective set of bits that, when set to a value, cause one or more sets of bandwidth segments, of the plurality of bandwidth segments, to be reserved within the operating spectrum, and where the one or more sets of bandwidth segments identify where the one or more bandwidth allocations begin and end, within the operating spectrum, relative to the pointer;

transmitting, to a destination node, an instruction to establish the channel, where the instruction includes the pointer, the channel spacing, and the one or more bit words; and transmitting the traffic, to the destination node and via the channel, based on an indication that the destination node established the channel.

2. The method of claim 1, where generating the one or more bit words further includes:

setting each bit, within the respective set of bits, to the value that causes the one or more bandwidth segments to be allocated to the channel.

3. The method of claim 2, where setting each bit, associated with a first bit word of the one or more bit words, causes a first set of bandwidth segments, of the one or more sets of bandwidth segments, to be allocated to create a first bandwidth allocation, where the first bandwidth allocation includes contiguous frequencies, within the operating spectrum, that have been allocated to the channel.

4. The method of claim 3, where setting each bit, associated with a second bit word of the one or more bit words, causes a second set of bandwidth segments, of the one or more sets of bandwidth segments, to be allocated to create a second bandwidth allocation, where the second bandwidth allocation is contiguous with respect to the first bandwidth allocation when no unallocated bandwidth segments, of the plurality of bandwidth segments, exist between the first bandwidth segment and the second bandwidth segment.

5. The method of claim 3, where setting each bit, associated with a second bit word of the one or more bit words, causes a second set of bandwidth segments, of the one or more sets of bandwidth segments, to be allocated to create a second bandwidth allocation, where the second bandwidth allocation is non-contiguous with respect to the first bandwidth allocation when at least one unallocated bandwidth segment, of the plurality of bandwidth segments, exist between the first bandwidth segment and the second bandwidth segment.

6. The method of claim 1, where the channel spacing identifies a quantity of bandwidth associated with each bandwidth segment of the plurality of bandwidth segments.

7. The method of claim 1, where identifying the plurality of bandwidth segments, further includes:

generating a value that corresponds to the one or more of the plurality of bandwidth segments by dividing the traffic bandwidth by the channel spacing.

8. The method of claim 1, where the pointer corresponds to a lowest frequency, within the operating spectrum, associated with at least one of the one or more bandwidth allocations to be used for the channel.

9. The method of claim 1, where each bit word, of the one or more bit words, includes a fixed quantity of bits, and where the method further includes:

determining a quantity of bit words to be generated based on a quantity, associated with the plurality of bandwidth segments, divided by the fixed quantity of bits.

10. The method of claim 1, where the traffic is transmitted, via the channel, up to a maximum data rate that is greater than one terabit per second (Tbps).

11. The method of claim 1, further comprising:

receiving another instruction to establish another channel that depends on a quantity of bandwidth associated with other traffic;

obtaining, from the other instruction, information that identifies a quantity associated with a collection of bandwidth allocations that are to be established for the other channel; and identifying a respective first bandwidth segment that corresponds to a beginning of each of the collection of bandwidth allocations and a respective second bandwidth segment that corresponds to an end of each of the collection of bandwidth allocations.

12. The method of claim 11, where at least one bandwidth segment, that has not been allocated to the other channel, exists between a first one of the collection of bandwidth allocations and a second one of the collection of bandwidth allocations.

13. A node comprising:

a line card; and a controller to:

receive an instruction to establish a channel having a bandwidth that is based on an operating spectrum associated with one or more optical fibers served by the node, obtain, as a result of the instruction, information that identifies a quantity of entries to be used to establish the channel, where the quantity of entries identifies a quantity of bandwidth allocations to be used to establish the channel, identify, based on the quantity of entries, a first pair of pointers that identify a first bandwidth segment and a second bandwidth segment, where the first bandwidth segment and the second bandwidth segment identify where, within the operating spectrum, a first bandwidth allocation starts and ends, respectively, identify, based on the quantity of entries, a second pair of pointers that identify a third bandwidth segment and a fourth bandwidth segment, where the third bandwidth segment and the fourth bandwidth segment identify where, within the operating spectrum, a second bandwidth allocation starts and ends, respectively, transmit, to a destination node, allocation information that identifies at least one of the quantity of entries, the first pair of pointers, or the second pair of pointers, where the allocation information allows the destination node to establish the channel based on the first bandwidth allocation and the second bandwidth allocation, and transmit, to the destination node and via the line card, first traffic via the first bandwidth allocation and second traffic via the second bandwidth allocation.

14. The node of claim 13, where the controller is further to:

obtain, from a memory associated with the node, information that identifies a channel spacing to be used to establish the channel, and establish bandwidth segments, that correspond to equal portions of the operating spectrum, based on the channel spacing.

15. The node of claim 13, where a respective quantity of bandwidth, associated with each of the first bandwidth allocation or the second bandwidth allocation, increases or decreases in increments, associated with the channel spacing, when the operating spectrum increases or decreases, respectively.

16. The node of claim 13, where the controller is further to:
allocate a first group of bandwidth segments between the first bandwidth segment and the second bandwidth segment to establish the first bandwidth allocation associated with the channel, and
allocate a second group of bandwidth segments between the third bandwidth segment and the fourth bandwidth segment to establish the second bandwidth allocation associated with the channel.

17. The node of claim 16, where the first group of bandwidth segments and the second group of bandwidth segments do not include any bandwidth segments that are not allocated to the first bandwidth allocation or the second bandwidth allocation.

18. The node of claim 13, where at least one bandwidth segment exists between the first bandwidth allocation and the second bandwidth allocation.

19. The node of claim 13, where the controller is further to:
receive another instruction to establish another channel having a bandwidth that is based on a traffic bandwidth associated with other traffic,
obtain, from the other instruction, information that identifies another quantity of entries associated with the other channel,
determine that the other channel is to be established based on a contiguous bandwidth allocation when the other quantity of entries is equal to one, and
determine that the other channel is to be established based on a non-contiguous bandwidth allocation when the other quantity of entries is greater than one.

20. A node comprising:
an output port; and
a controller to:
receive an instruction to establish a channel having an operating spectrum that corresponds to one or more optical fibers, served by the node,
determine, based on the instruction, a quantity of entries for establishing the channel,
generate a first pair of pointers when the quantity of entries is equal to one, where the first pair of pointers identifies a beginning and an end of a contiguous group of bandwidth segments, of a plurality of bandwidth segments associated with the operating spectrum,
generate at least a second pair of pointers and a third pair of pointers when the quantity of entries is greater than one, where:
the second pair of pointers identify a beginning and an end of a second contiguous group of bandwidth segments, of the plurality of bandwidth segments, and
the third pair of pointers identify a beginning and an end of a third contiguous group of bandwidth segments, of the plurality of bandwidth segments,
establish a first channel or a second channel based on whether the quantity of entries is greater than one, where the first channel is based on a first bandwidth allocation that is reserved by the first contiguous group of bandwidth segments, and where the second channel is based on a second bandwidth allocation that is reserved by the second contiguous group of bandwidth segments and a third bandwidth allocation that is reserved by the third contiguous group of bandwidth segments, and
transmit traffic, via the output port and to another node, via the first channel or the second channel.

21. The node of claim 20, where, when establishing the first channel, the controller is further to:
store, in a data structure, allocation information associated with the first channel, where the allocation information includes at least one of:
information that identifies the quantity of entries
information that uniquely identifies the first channel,
information that indicates that the first channel is not based on a fixed bandwidth that is independent of a quantity of bandwidth associated with the traffic,
a channel size that identifies a quantity of bandwidth associated with the plurality of bandwidth segments associated with the operating spectrum,
a first pointer, of the first pair of pointers, that identifies a first bandwidth segment, within the operating spectrum, where the first contiguous group of bandwidth segments begins, or
a second pointer, of the first pair of pointers, that identifies a second bandwidth segment, within the operating spectrum, where the first contiguous group of bandwidth segments ends.

22. The node of claim 21, where, when establishing the first channel, the controller is further to:
append the data structure to a packet,
transmit the packet, to the other node and via the one or more optical fibers that connects the node to the other node,
receive, from the other node, an indication that the first channel has been established on the network path, and
transmit the traffic, via the first channel and the one or more optical fibers, to the other node.

23. The node of claim 20, where, when establishing the second channel, the controller is further to:
store, in a data structure, allocation information associated with the second channel, where the allocation information includes at least one of:
information that identifies the quantity of entries,
a first pointer that identifies where, within the operating spectrum, the second contiguous group of bandwidth segments begins,
a second pointer that identifies where, within the operating spectrum, the second contiguous group of bandwidth segments ends,
a third pointer that identifies where, within the operating spectrum, the third contiguous group of bandwidth segments begins, or
a fourth pointer that identifies where, within the operating spectrum, the third contiguous group of bandwidth segments ends.

24. The node of claim 23, where, when establishing the second channel, the controller is further to:
append the data structure to a packet,
transmit the packet, to the other node and via one or more optical fibers that connect the node to the other node,
receive, from the other node, an indication that the second channel has been established on the network path, and
transmit the traffic, via the second channel and the one or more optical fibers, to the other node.

* * * * *